(No Model.)
P. G. DE BLANC.
CIRCULAR SAWING MACHINE.
No. 316,752. Patented Apr. 28, 1885.
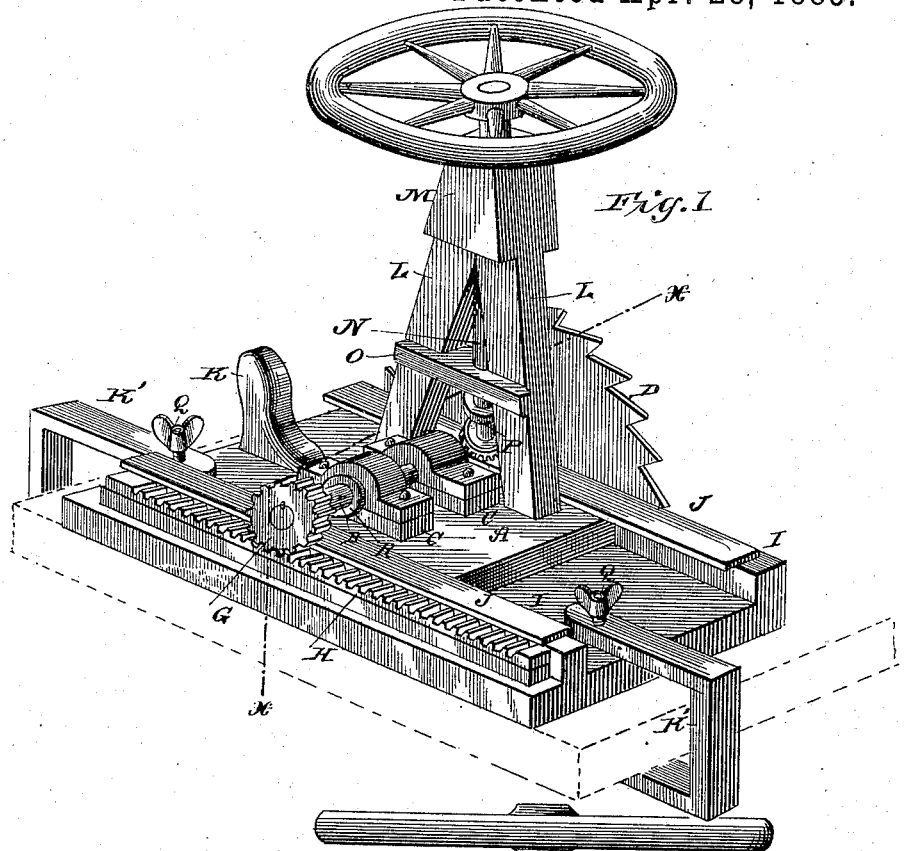
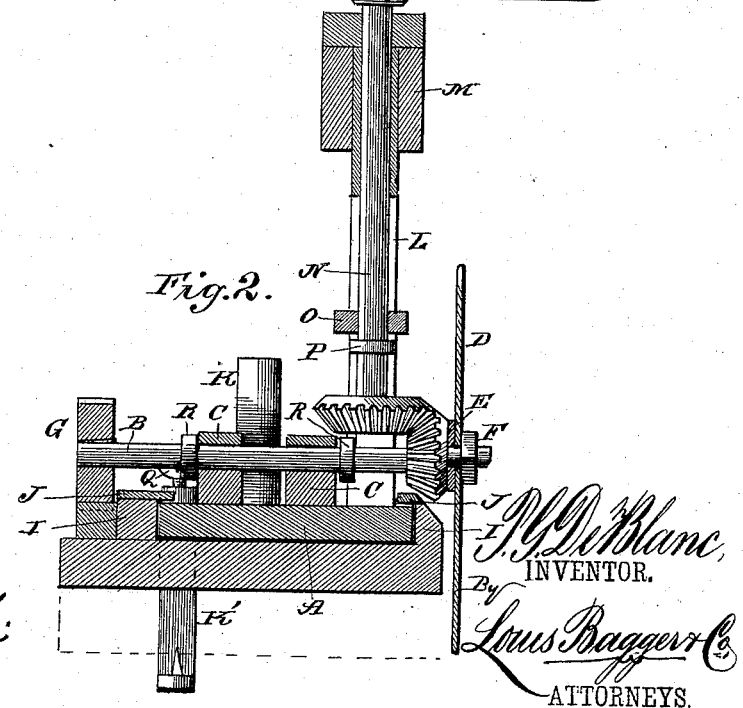
WITNESSES:
Fred. G. Dieterich
Arthur L. Morsell
P. G. De Blanc,
INVENTOR.
By Louis Bagger & Co.
ATTORNEYS.

United States Patent Office.

PETER GEORGE DE BLANC, OF NEW IBERIA, LOUISIANA.

CIRCULAR SAWING MACHINE.

SPECIFICATION forming part of Letters Patent No. 316,752, dated April 28, 1885.

Application filed January 29, 1885. (No model.)

*To all whom it may concern:*

Be it known that I, PETER G. DE BLANC, a citizen of the United States, and a resident of New Iberia, in the parish of Iberia and State of Louisiana, have invented certain new and useful Improvements in Hand Sawing-Machines; and I do hereby declare that the following is a full, clear, and exact description of the invention, which will enable others skilled in the art to which it appertains to make and use the same, reference being had to the accompanying drawings, which form a part of this specification, and in which—

Figure 1 is a perspective view of my improved sawing-machine, and Fig. 2 is a vertical sectional view taken through the line $x$ $x$ of Fig. 1.

Similar letters of reference indicate corresponding parts in all the figures.

This invention relates to that class of circular saws which are operated by hand, and has for its object the providing a movable frame with a self-actuating circular saw, and also a revolving fly-wheel for storing the power of the operator and transmitting it to the revolving saw by suitable mechanism, all of which will be hereinafter more particularly described and claimed.

Referring to the accompanying drawings, A represents a movable frame. B is the saw-arbor, which is supported on said frame by bearings C C, and to one end of which the circular saw D is attached by means of a collar, E, and nut F. On the opposite end is secured by a slot and key, or other suitable means, a pinion, G, which engages with the teeth of the rack H, and causes the arbor and saw to revolve rapidly as the frame is moved forward or backward within the guide-rails I I. To the upper side of the guide-rails are secured strips of metal J J to prevent the frame A from being lifted out of its place while in operation.

K is a handle fastened to the frame A for pushing it back and forth.

The guide-rails I I and toothed rack H are of any desired length, and are secured to a board of the same length and of suitable width, which in turn is secured by clamps K' K' and screws Q Q to a table or other convenient object on which are placed the boards to be operated upon.

On the side of the frame A next to the saw is secured an upright frame composed of the pieces L L, united at the top by the casting M, to which is secured a bearing for the shaft N. Near the bottom of the frame is secured another bearing for the shaft N, on the top of which shaft is a large fly-wheel, and secured to the bottom of it is a bevel-pinion whose cogs engage with the cogs of another bevel-pinion, which is properly fastened to the saw-arbor. Said shaft is provided with a collar, P, which is secured just below the bearing of the cross-tie O, which prevents the shaft from rising and the cogs from becoming disengaged.

The saw-arbor B is provided with collars R R at the bearings C C, so as to prevent any lateral motion of the shaft, thus causing the saw to move forward in a straight line.

The operation of my invention is as follows: Secure it by the clamps to a table where desired, having drawn the movable frame back to the extreme end of the guide-bars and rack. Place the board to be operated upon lengthwise along the frame in front of the saw. The force of the operator pushing the movable frame forward causes the teeth of the pinion to engage with the teeth of the rack and rotate as the frame moves forward. This in turn imparts motion to the saw, and, through the bevel-gearing, to the shaft and fly-wheel on top. By placing the board to be sawed a short distance in front of the saw it allows the fly-wheel to acquire sufficient momentum, together with the continued force of the operator, to enable the saw-teeth to cut a kerf as fast as it is advanced by the movable frame to which it is attached. Besides operating as a rip-saw, the machine will also act as a cross-cut saw, by placing several boards side by side with their ends abutting against the side of the machine in front of the saw. The speed of the saw and fly-wheel will be regulated by the gearing and the size of the pinion that works in the rack.

It will be seen that my invention furnishes a cheap, compact, and efficient apparatus for sawing boards with a continuous cut and without any loss of time and power, as is done in the common hand-saw when it is being drawn up for the next stroke. It is light enough to be portable and still strong enough to be efficient.

Having thus described my invention, I claim and desire to secure by Letters Patent of the United States—

1. In a hand sawing-machine, the combination of a movable frame moving between fixed guide-bars, and carrying a horizontal shaft provided with a pinion at one end engaging with a stationary rack, and having a circular saw secured at the other, substantially as and for the purpose set forth.

2. In a hand sawing-machine, the combination of a movable frame moving between fixed guide-rails, and carrying a horizontal shaft provided with a pinion at one end engaging with a stationary rack, which causes the shaft to revolve as the frame moves back and forth, and having a circular saw secured to the other end, and also an upright frame to which is secured a shaft to the upper end of which is secured a fly-wheel and to the lower end the described gearing by which the motion of the wheel is communicated to the circular saw, and necessary clamps for fastening the entire mechanism in any desired place, substantially as and for the purpose set forth.

In testimony that I claim the foregoing as my own I have hereunto affixed my signature in presence of two witnesses.

PETER GEORGE DE BLANC.

Witnesses:
 LOUIS ALUI DUPUY,
 PAUL ADONIS DUPUY.